Patented Sept. 28, 1948

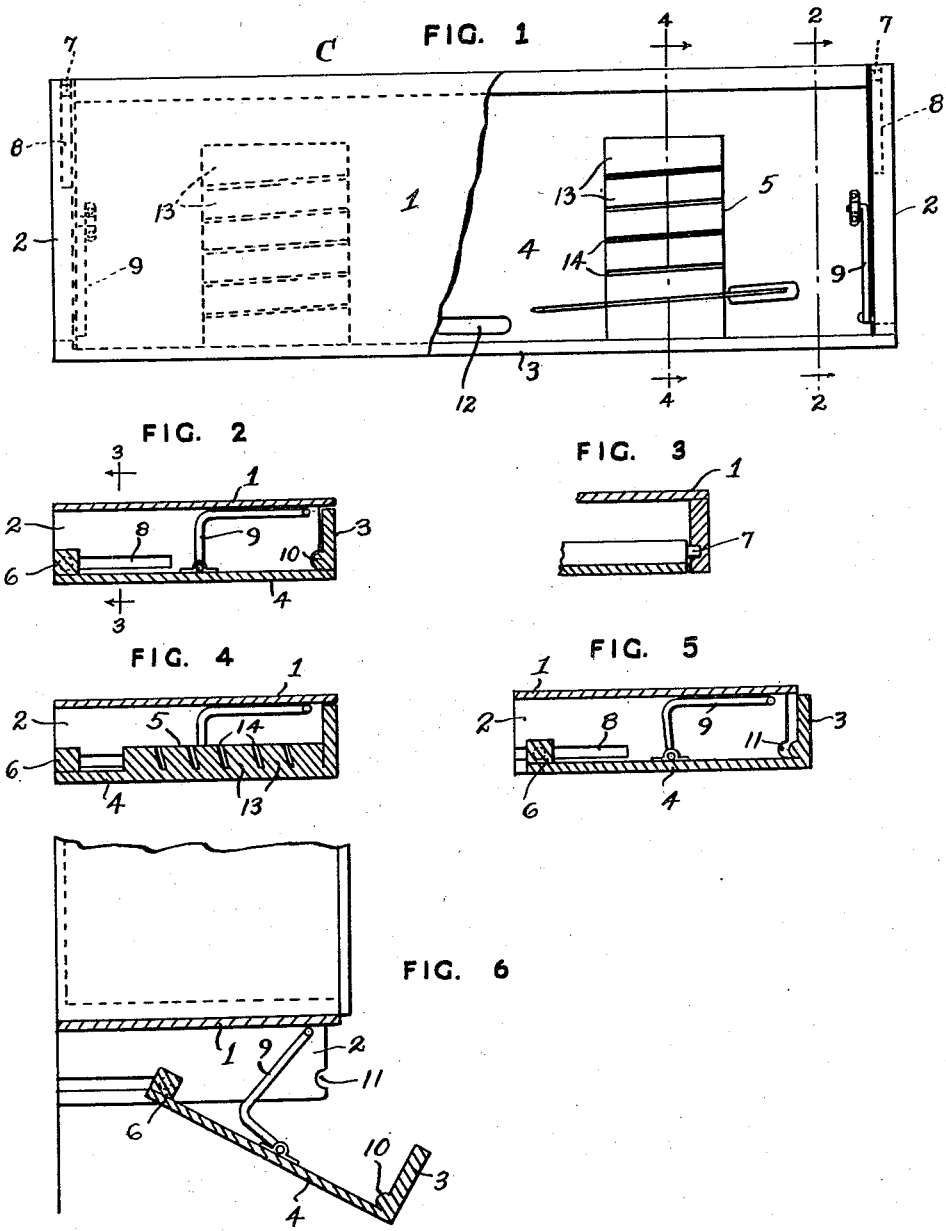

2,450,233

UNITED STATES PATENT OFFICE 2,450,233

TILTABLE UTENSIL DRAWER

Joseph R. Cummings, Venice, Calif.

Application October 9, 1945, Serial No. 621,204

2 Claims. (Cl. 312—181)

The present invention relates to kitchen racks, and is more particularly concerned with a case which is adapted to enclose the eating utensils and when opened to expose all of them.

One of the objects of the invention is to provide a case and utensil rack which can be readily opened and closed.

Another object of the invention is to provide a utensil case and rack of simpler and more compact construction than what is disclosed in prior devices.

With the foregoing and other objects and advantages in view, the invention consists of the novel construction and arrangement of parts hereinafter described and claimed.

In the accompanying drawings illustrating the invention:

Figure 1 is a top plan view of the invention with the top partly broken away.

Figure 2 is a vertical transverse section on line 2—2 of Figure 1.

Figure 3 is a partial longitudinal section on line 3—3 of Figure 2.

Figure 4 is a vertical transverse section on line 4—4 of Figure 1.

Figure 5 is a sectional view similar to Figure 2 with front and bottom partially open.

Figure 6 is a transverse section showing attachment of utensil case and rack to a kitchen cupboard with the slidable bottom in open position.

Like numerals in the description and drawings designate like parts of construction.

The casing C for the racks comprises a top 1, end walls 2, front 3 and a movable bottom 4 which carries one or more racks 5 for knives, forks and the like. The rear of the bottom is provided on its upper surface with a longitudinal bar 6 and studs 7 projecting from the ends thereof. These studs or pins are seated in longitudinal grooves 8 in the interior walls of the casing ends and extend part way from the rear of the case to its front.

Bottom 4 is pivotally connected to the ends of the case by substantially L-shaped spring metal rods 9, which are also pivotally connected to lugs on the upper surface of the bottom. The front 3 is provided interiorly along the bottom with a horizontal bead or rib 10 which is adapted when closed to engage notches 11 in the front ends of the end walls of rack casing C. On the underside near the front, the bottom 4 is provided with a finger slot 12 to facilitate opening of the case.

On the upper surface of bottom 4 are suitable spaced and positioned blocks 13 which are secured thereto and have slanting or inclined spaces or slots 14 adapted to hold knives, forks and the like.

It will be understood that while these slots are illustrated as for knives, they may be of any suitable form for other utensils. While the case and racks in the embodiment of the invention shown are adapted to be portable, yet the case can be readily attached to a kitchen cabinet, as shown in Figure 6.

In operation, the case is opened by inserting a finger in the slot 12 and pulling the front and bottom forward. The pins 7 slide forward in the grooves 8 and the spring metal rods 9, serving as hinges, let the bottom swing downwardly and forwardly, thus exposing the utensil racks to view.

When desirable to close the case, the front is pushed up and toward the rear and the bottom is caused to close. As soon as the bead or rib on the inside of the front seats in the grooves in the ends of the case, the two spring metal rods act to lock the bottom in normal position, due to the tension on the elbows or bends of the rods.

Having thus described my invention, what I claim as new and desire to secure by Letters Patent is:

1. A utensil container consisting of a rectangular casing having end walls and open at its front, a movable bottom provided with racks, each of said racks having a plurality of obliquely disposed slots for the support of utensils therein, laterally projecting studs on the rear end of the bottom slidable in grooves in the end walls of the casing, a front cover for said casing secured to the front of the bottom and provided interiorly with a longitudinal bead adjacent said bottom and adapted to seat in notches in the front edges of the end walls of the casing, and bowed spring metal elements pivotally attached to the bottom of the casing approximately midway between front and rear and pivotally attached at the other ends to the end walls of the casing.

2. A utensil container including spaced end walls, each of said end walls being provided with a longitudinal groove, a forwardly-slidable and swingable bottom mounted intermediate said end walls, a longitudinal bar carried by said bottom and having its ends extending into said grooves, and a rearwardly and downwardly bent spring pivotally connected to each of said end walls and to said bottom to thereby prevent said bottom from swinging too far when in its forwardly-advanced position.

JOSEPH R. CUMMINGS.

REFERENCES CITED

The following references are of record in the file of this patent:

UNITED STATES PATENTS

| Number | Name | Date |
|---|---|---|
| 638,586 | Mueller | Dec. 5, 1899 |
| 1,161,189 | Coleston | Nov. 23, 1915 |
| 1,345,194 | Johnson | June 29, 1920 |
| 1,408,054 | Williams | Feb. 28, 1922 |
| 1,788,883 | Madsen | Jan. 13, 1931 |